(12) United States Patent
Huang et al.

(10) Patent No.: US 7,779,283 B2
(45) Date of Patent: Aug. 17, 2010

(54) COMPUTER AND METHOD FOR REALIZING HOUSEHOLD APPLIANCE APPLICATION WITH LOW POWER CONSUMPTION

(75) Inventors: Shuangxi Huang, Beijing (CN); Wei Zhang, Beijing (CN); Lei Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 679 days.

(21) Appl. No.: 11/666,282

(22) PCT Filed: Jul. 11, 2005

(86) PCT No.: PCT/CN2005/001021

§ 371 (c)(1),
(2), (4) Date: Apr. 25, 2007

(87) PCT Pub. No.: WO2006/045230

PCT Pub. Date: May 4, 2006

(65) Prior Publication Data

US 2007/0300090 A1    Dec. 27, 2007

(30) Foreign Application Priority Data

Oct. 25, 2004   (CN) ..................... 2004 1 0084150

(51) Int. Cl.
*G06F 1/00* (2006.01)
*G06F 3/00* (2006.01)
*G09G 5/08* (2006.01)
*G09G 5/00* (2006.01)

(52) U.S. Cl. .................. 713/323; 713/300; 713/324; 710/14; 710/18; 345/158; 345/211

(58) Field of Classification Search .............. 713/300, 713/323, 324; 710/14, 18; 345/158, 211
See application file for complete search history.

(56) References Cited

U.S. PATENT DOCUMENTS

| 6,041,225 A | * | 3/2000 | Jung | 455/352 |
| 6,125,449 A | * | 9/2000 | Taylor et al. | 713/310 |
| 6,289,399 B1 | * | 9/2001 | Furuichi et al. | 710/6 |
| 6,931,557 B2 | * | 8/2005 | Togawa | 713/323 |
| 7,120,811 B1 | * | 10/2006 | Bingi et al. | 713/324 |
| 7,136,951 B2 | * | 11/2006 | Deng et al. | 710/302 |
| 7,219,240 B2 | * | 5/2007 | O | 713/300 |

FOREIGN PATENT DOCUMENTS

| CN | 1497411 A | 5/2004 |
| JP | 3402049 B2 | 4/2003 |
| JP | 2003330581 A1 | 11/2003 |

OTHER PUBLICATIONS

International Search Report in the prior international PCT Appln. No. PCT/CN2005/001021.

* cited by examiner

*Primary Examiner*—Stefan Stoynov
(74) *Attorney, Agent, or Firm*—Dickstein Shapiro LLP

(57) ABSTRACT

The invention discloses a computer which achieves household appliance applications with low power consumption, wherein a power consumption controller is further provided in the computer, which is connected to CPU on the mainboard and power supply of computer respectively; said CPU on the mainboard receives an external low power consumption operation command, detects a current application process, when media application process is detected, thus according to the media application, determines the due state of power supply of each of appliances of the media application at the media application, and low power consumption control command is sent to the power consumption controller according to the due state; said power consumption controller receives low power consumption control command, and a command for reducing the supply voltage or turning off the power supply of each equipment of the media application, is sent to the power supply of computer; said power supply of computer reduces the supply voltage or turns off the power supply of each appliance of the media application according to the command. The invention also discloses a method for achieving household appliance application with low power consumption by computer.

14 Claims, 3 Drawing Sheets

COMPUTER AND METHOD FOR REALIZING HOUSEHOLD APPLIANCE APPLICATION WITH LOW POWER CONSUMPTION

BACKGROUND OF THE INVENTION

1. Field of Invention

The present invention relates to the technology of computer applications, more specifically, to a computer for realizing low-power-consumption household appliance applications and a method thereof.

2. Description of Prior Art

Today the application of a computer in household appliances is mainly the media-type application, of which the most basic implementation is generally to perform playing, recording and editing of various media based on system software by using the hardware devices of a computer, such as a CD driver, a video adapter, a display, an audio adapter, a stereo, an earphone and the like.

In view of the demand for application in household appliances, a personal computer (PC) orientated to media application is commonly equipped with a display screen characterized by household-appliance features, for example, a small LCD screen or a vacuum flat display (VFD) which is common in household appliances. The basic architect of such a PC is shown in FIG. 1, which is the schematic structure diagram of a household-appliance-orientated PC of the prior art. The PC comprises a mainframe 100, a display 110, a keyboard and a mouse 120, a VFD display 130 and other peripheral devices 140 such as a printer and a scanner.

The VFD display 130 is connected to the mainboard of the mainframe 100 via a COM interface or a USB interface and controlled by the mainframe 100 to display some information about the application such as media playing, for example, chapters during DVD playing, time progress during playing, or fast-forward or fast-backward state. Some kinds of VFD displays 130 are provided with a infrared remote control receiver for receiving and interpreting a command transmitted from a remote controller and then sending the interpreted command to the mainframe 100, which controls a media playing device based on the command.

In the above media application, the overall system of software and hardware operates at full speed regardless what parts of the system are involved. This results in not only a considerable power consumption of the system but also a tremendous waste of system resources.

The conventional computer provides a method of performing the CD playing function by a function key in the power-off or hibernation state of the computer. Such simple CD playing is achieved by providing a simple execution program in the BIOS of the computer and utilizes primarily the disk-reading function of a CD driver itself. Such CD playing, however, cannot read multimedia data on the hard disk or other peripheral devices of the computer. Moreover, although this application doesn't activate the software system, the hardware system still runs at full speed and the system power consumption remains relatively high.

SUMMARY OF THE INVENTION

In view of the above-described problem, the object of the present invention is to provide a computer for realizing a low-power-consumption household appliance application, which consumes less power than that of the prior art when applied in household appliances.

Another object of the present invention is to provide a method for realizing a low-power-consumption household appliance application by using a computer. With this method, the computer consumes less power than that of the prior art when applied in household appliances.

In order to achieve one aspect of the above object, the present invention provide a computer for realizing household appliance application with low power consumption, which comprises at least a mainboard with a CPU and a computer power supply for supplying power to respective functional devices of the computer;

said computer is further provided with a power consumption controller connected to the CPU on the mainboard and the computer power supply, respectively;

said CPU on the mainboard receives a low-power-consumption operation command from the external, detects current application process; when a media application process is detected, it determines a due state of each power supply of devices for the media application according to the media application, and based on the determined due state, sends a low-power-consumption control command to the power consumption controller;

said power consumption controller receives the low-power-consumption control command, and based on the command, sends to the computer power supply a command for reducing the supply voltage or turning off the power supply for each of the devices for the media application;

said computer power supply reduces the supply voltage or turns off the power supply for each of the devices for the media application according to said command.

Said power consumption controller can be provided on the mainboard of the computer, and comprises at least a first monolithic microprocessor;

said computer power supply includes a power supply control module and a power supply module;

said power consumption controller is connected via the first monolithic microprocessor to the CPU on the mainboard and the power supply control module of the computer power supply, respectively; the first monolithic microprocessor receives the low-power-consumption control command, and based on the received command, sends a to the power supply control module of the computer power supply command for reducing the supply voltage or turning off the power supply for each of the devices for the media application;

in said computer power supply, the power supply control module, based on the received command, controls the power supply module to reduce the supply voltage or turn off the power supply for each of the devices for the media application.

Said power supply control module includes at least a second monolithic microprocessor;

said power supply control module is connected via the second monolithic microprocessor to the first monolithic microprocessor and the power supply module, respectively; based on the command for reducing the supply voltage or turning off the power supply received from the first monolithic microprocessor, the second monolithic microprocessor instructs and controls the power supply module to reduce the supply voltage or turn off the power supply for each of the devices for the media application.

Said second monolithic microprocessor can be connected to the first monolithic microprocessor via a serial interface or a parallel interface.

Said power consumption controller can be realized with a monolithic microprocessor in a peripheral device of the computer; said computer power supply includes a power supply control module and a power supply module;

said power consumption controller is connected via the monolithic microprocessor of the peripheral device to the CPU on the mainboard and the power supply control module of the computer power supply, respectively; the monolithic microprocessor of the peripheral device receives the low-power-consumption control command, and based on the received command, sends to the power supply control module of the computer power supply a command for reducing the supply voltage or turning off the power supply for each of the devices for the media application;

in said computer power supply, the power supply control module, based on the received command, controls the power supply module to reduce the supply voltage or turn off the power supply for each of the devices for the media application.

Said power supply control module includes at least a second monolithic microprocessor;

said power supply control module is connected via the second monolithic microprocessor to the microprocessor of the peripheral device and the power supply module, respectively; based on the command for reducing the supply voltage or turning off the power supply received from the microprocessor of the peripheral device, the second monolithic microprocessor controls the power supply module to reduce the supply voltage or turn off the power supply for each of the devices for the media application.

Said peripheral device having a monolithic microprocessor can be a VFD display; the microprocessor of the VFD display is connected to the CPU on the mainboard and the power supply control module of the computer power supply, respectively;

the monolithic microprocessor of the VFD display receives the low-power-consumption control command, and based on the received command, sends to the power supply control module of the computer power supply a command for reducing the supply voltage or turning off the power supply for each of the devices for the media application.

A low-power-consumption mode switch can be provided on the panel of said VFD display; the monolithic microprocessor of the VFD display receives a low-power-consumption operation command from a user via said switch and sends it to the CPU on the mainboard.

Said VFD display can include an infrared remote control reception module; the monolithic microprocessor of the VFD display receives a low-power-consumption operation command from a remote controller used by a user via said infrared remote control reception module and sends it to said CPU on the mainboard.

Said second monolithic microprocessor can be connected to the monolithic microprocessor of the peripheral device via a serial interface or a parallel interface.

Said computer power supply can be an ATX power supply.

In order to achieve another aspect of the above object, the present invention provides a method for realizing a low-power-consumption household appliance application by using a computer, which comprises steps of:

A. detecting current application process by a CPU on a mainboard when it receives a low-power-consumption operation command;

B. when a media application process is detected, determining a due state of power supply of each of the devices for the media application according to the media application, and based on the determined due state, sending a low-power-consumption control command to a power consumption controller;

C. upon receiving the low-power-consumption control command, the power consumption controller, based on the command, sends to the computer power supply a command for reducing the supply voltage or turning off the power supply for each of the devices for the media application;

D. the computer power supply reduces the supply voltage or turns off the power supply for each of the devices for the media application based on the above command.

Said power consumption controller can be realized with a monolithic microprocessor on the mainboard or a monolithic microprocessor in a peripheral device of the computer.

Levels of respective media applications in the low-power-consumption operation mode can be preset, and due states of power supplies of respective devices are set and saved correspondingly to each of the preset levels;

said determining a due state of power supply of each of the devices for the media application in Step B is:
first determining the level to which the media application belongs, and then based on the determined level, determining the due state of power supply of each of the devices.

The frequency of the CPU suitable for each of the levels can be further preset;

said Step B further includes: after a level is determined, determining whether it is necessary to adjust the CPU frequency or not based on current CPU frequency and the CPU frequency suitable for the level, and adjusting the CPU frequency if necessary, otherwise no adjustment is made.

The due operation parameters of a system fan at each of the levels can also be preset;

said Step B further includes: after a level is determined, determining whether current operation parameters of the system fan are the same as the saved due operation parameters at the level or not, and if they are different, sending a command for adjusting the power supply of the system fan to the power consumption controller, otherwise no command is sent.

When the peripheral device having a monolithic microprocessor is a VFD display, a low-power-consumption mode switch can also be provided on the VFD display, and said method further comprises:

presetting levels of respective media applications in the low-power-consumption operation mode, each of the levels corresponding to one of key values of the low-power-consumption mode switch, and setting and saving due states of power supplies of respective devices corresponding to each of the levels;

said low-power-consumption operation command received by the CPU on the mainboard in Step A is a low-power-consumption operation command containing a level and is sent by the VFD display according to the key value of the low-power-consumption mode switch entered by a user;

said determining a due state of power supply of each of the devices for the media application in Step B is:
determining the due state of power supply of each of the devices according to the level contained in the low-power-consumption operation command.

When the peripheral device having a monolithic microprocessor is a VFD display with a remote control reception module, said low-power-consumption operation command received by the CPU on the mainboard in Step A is the one that is received by the remote control reception module of the VFD display from a remote controller, and then interpreted and sent to the CPU on the mainboard.

Said method can further comprise: after receiving a command for canceling low-power-consumption operation, the CUP on the mainboard sends a command for resuming normal supply of power to the power consumption controller;

the power consumption controller, depending on the power supply state of each of the devices at normal operation, sends to the computer power supply a command for resuming the power supply for the respective devices, and the computer power supply resumes the power supply for each of the devices at normal operation based on the command.

As can be seen from the above technical solution, the computer and the method for realizing household appliance application with low power consumption according to the present invention can make a real-time adjustment to corresponding hardware power supplies, that is, reducing the supply voltage or powering off the hardware, depending on various requirements on hardware from various media applications by using a power consumption controller provided in the computer, thereby a low-power-consumption household appliance application by the computer can be achieved.

DETAILED DESCRIPTION OF PREFERRED EMBODIMENTS

Figure 1:
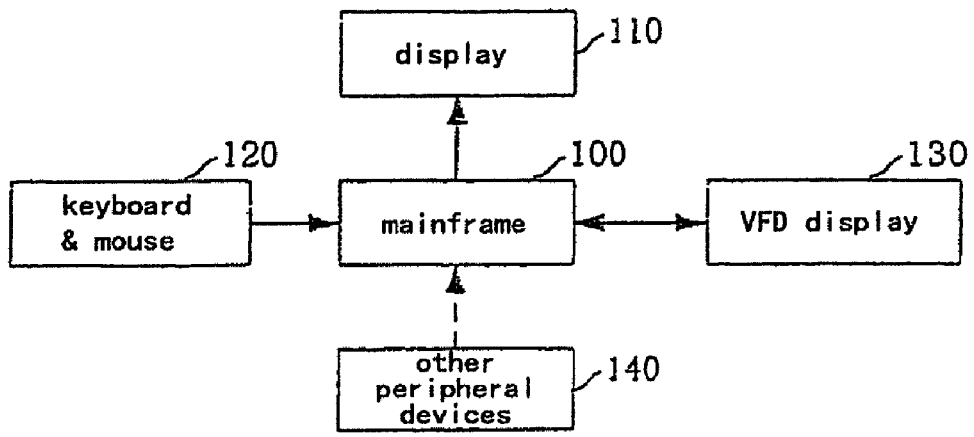
FIG. 1 is a schematic structural diagram of a household-appliance-orientated PC in prior art.

The object, technical solution and advantages of the present invention will be apparent from the following detailed explanation by way of embodiments with reference to the drawings.

The computer and the method for realizing household appliance application with low power consumption according to the present invention makes a real-time adjustment to corresponding hardware power supplies, that is, reducing the supply voltage or powering off the hardware, depending on various requirements on hardware from various media applications by using a power consumption controller provided in the computer, thereby a low-power-consumption household appliance application by the computer can be achieved.

In fact, as to a PC, the CPU frequency of the system can be controlled by some means. For example, Intel Corporation, a CPU chip manufacture, has currently published the relevant application program interface (API) functions required for changing a CPU frequency through software program. With these APIs, the operating frequency of a CPU can be changed by setting corresponding values to some specific bits in registers of the CPU. Although it is unnecessary to some media applications to operate at high CPU frequency, almost all the current media applications don't operate at a lowered CPU frequency but at full CPU frequency. Therefore, the present invention further utilizes this function of the CPU and adjusts the operation frequency of the CPU in a real-time manner depending on various demands on the operating speed from various media applications, and thereby the power consumption for media applications can be further decreased.

The present invention can be implemented in at least two ways as follows.

The first implementation is to add a power consumption controller to a mainboard of a PC mainframe;

The second implementation is to utilize a peripheral device of a PC containing a monolithic processor system and to implement the function of a power consumption controller by using the monolithic processor of the peripheral device.

Hereafter, the two implementation of the present invention will be described in detail by way of two embodiments, respectively.

The First Embodiment

This embodiment is in accordance with the first implementation. First reference is made to FIG. 2, which is a schematic structural diagram of a PC in a low-power-consumption application according to a first preferred embodiment of the present invention. In this embodiment, only a power consumption controller 202 is added to a mainboard 200 (other devices on the mainboard 200 are irrelevant to the present invention and thus are not shown for the purpose of a simple illustration), and the other devices in FIG. 2, such as a video adapter 220, a display 230, a system fan 240 and a CPU fan 250, are the original ones belonging to the computer. They are connected to an ATX power supply 210 and the mainboard 200 in the same manner as in the prior art, the description thereof will be omitted here.

The ATX power supply 210 in this embodiment supplies AC-DC current to most of the hardware, including the above mainboard 200 and the CPU, the display 230, the system fan 240, the CPU fan 250 and the video adapter 220.

Figure 2:
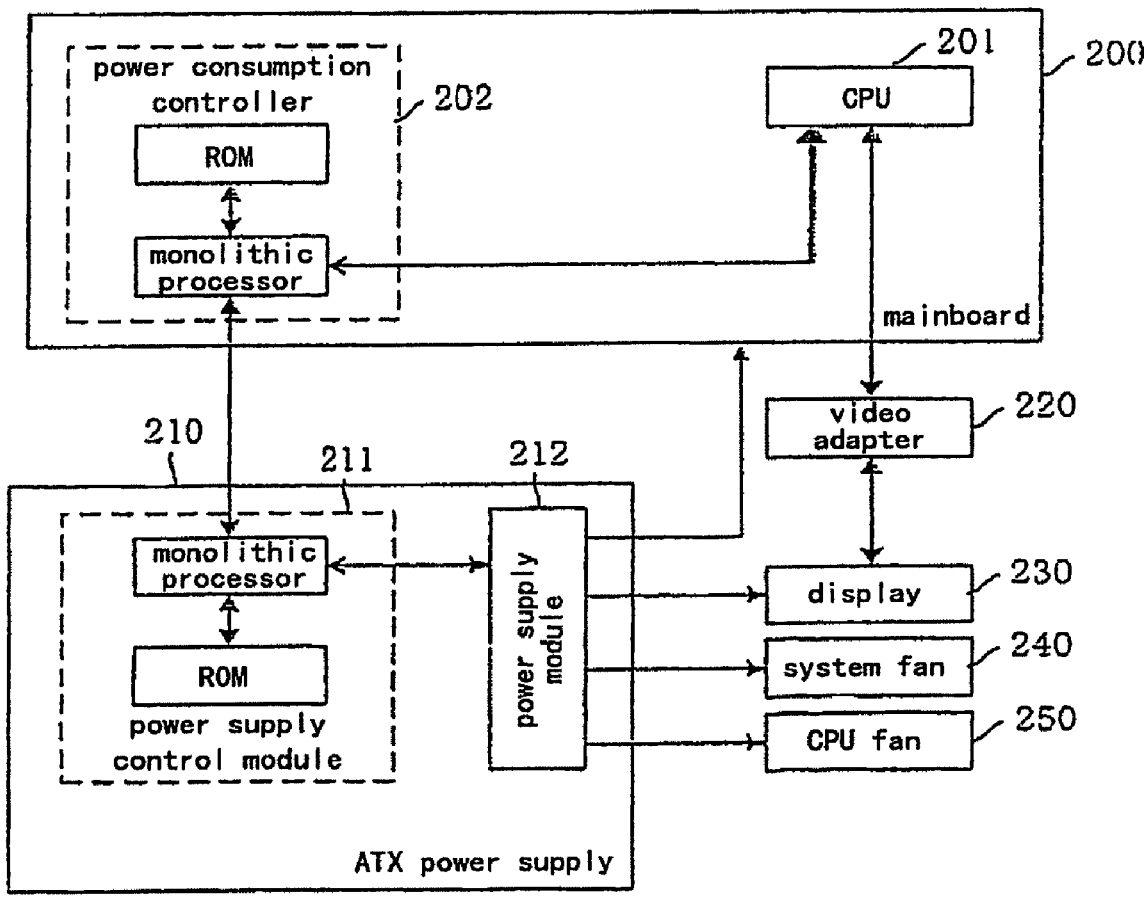
FIG. 2 is a schematic structural diagram of a PC in a low-power-consumption application according to a first preferred embodiment of the present invention.

In FIG. 2, the power consumption controller 202 is implemented with a monolithic processor (i.e. a SMC) and its program memory ROM. The monolithic processor in the power consumption controller 202 is connected to the CPU 201 on the mainboard and a monolithic processor of a power supply control module 211 in the ATX power supply 210, respectively.

The CPU 201 on the mainboard receives a low-power-consumption operation command entered by a user, monitors and detects current application process. When certain media application process is detected, the CPU 201 determines a due state of the power supply of each of the devices for the media application based on the detected media application, and sends a low-power-consumption control command to the power consumption controller 202 according to the determined due state. For example, if the current media application is playing MP3, the power supply of the display 230 should be turned off, and thus a command for turning off the power supply of the display 230 is sent to the power consumption controller 202.

In this embodiment, the devices for media applications include the display 230, the system fan 240, etc.

The monolithic processor in the power consumption controller 202 receives the low-power-consumption control command from the CUP 201 on the mainboard, and based on the received command, sends a command for reducing the supply voltage or turning off the power supply of each of the media devices to the monolithic processor of the power supply control module 211 in the ATX power supply 210.

According to the received command for reducing the supply voltage or turning off the power supply of each of the devices, the monolithic processor in the power supply control module 211 controls a power supply module 212 to adjust power supply for each of the media devices. For instance, if the current media application is playing MP3, the command received by the power consumption controller 202 is for turning off the power supply of the display 230, and the monolithic processor in the power supply control module 211 controls the power supply module 212 to turn off the power supply of the display 230.

In this embodiment, the monolithic processor in the power consumption controller 202 and the monolithic processor in the power supply control module 211 can be connected to each other via a serial communication interface or an extended serial communication interface, and send the command for reducing the supply voltage or turning off the power supply of each of the media devices in series; they can also be connected via a parallel interface, with the command for reducing the supply voltage or turning off the power supply of each of the media devices being represented by high or low level of each signal line in the parallel interface.

Power consumption in this embodiment is further reduced by adjusting the CPU frequency with software. Hereafter, a description is made to the entire operation flow for realizing household appliance applications with low power consumption.

Figure 3:
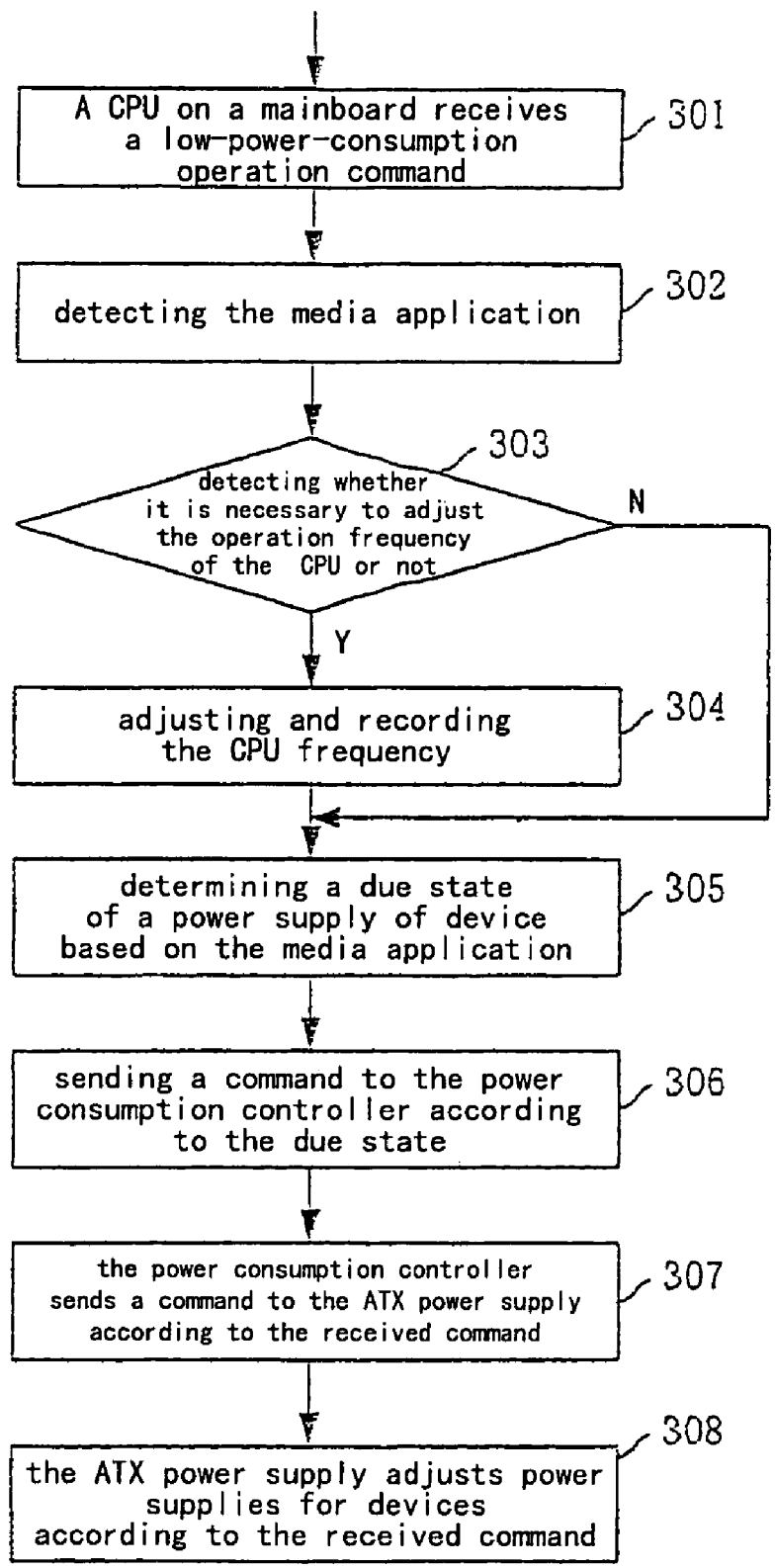
FIG. 3 is a schematic flowchart for implementing the low-power-consumption application of the embodiment shown in FIG. 2.

Now refer to FIG. 3, which is a schematic flowchart for the low-power-consumption application of the embodiment shown in FIG. 2. This flow comprises the following steps.

Step 301: receiving a low-power-consumption operation command entered by a user by the CPU 201 on the mainboard. Here, the user can enter the low-power-consumption operation command through an input device, such as a keyboard and a mouse. Upon receiving the command, the system enters into a low-power-consumption operation mode.

Step 302: starting to monitor/detect current media application.

Step 303: determining whether it is necessary to adjust the frequency of the CPU 201 on the mainboard or not when a media application is detected, and proceeding to Step 304 if necessary, otherwise proceeding to Step 305.

In this embodiment, levels for several media applications in the low-power-consumption operation mode can be preset, and parameters corresponding to each of the levels can also be set and saved, the parameters including:
1. due state of power supply of each of the devices at the level;
2. CPU frequency suitable to the level;
3. due operation parameters of the system fan 240 at the level.

In Step 303, first a corresponding level can be found based on the media application, and a CPU frequency suitable to the level can be retrieved from the saved parameters for the level. Then, the current CPU frequency is compared with the CPU frequency suitable to the level, and if they are the same, it is unnecessary to adjust a CPU frequency, otherwise it is necessary to adjust the CPU frequency.

Step 304: adjusting the CPU frequency and recording the current CPU frequency.

In this step, the CPU frequency is adjusted by employing a relevant API required for changing CPU frequency and published by a CPU manufacture and setting certain bits in registers of the CPU to corresponding values.

Step 305: determining the due state of power supply of each of the devices and the due operation parameters of the system fan 240 based on the media application.

In this step, first the corresponding level is obtained according to the media application, and then the due state of power supply of each of the devices and the due operation parameters of the system fan 240 for the application are retrieved from the saved parameters for the level.

Step 306: sending a low-power-consumption control command to the monolithic processor in the power consumption controller 202 according to the determined due state of power supply of each of the devices and the due operation parameters of the system fan 240.

For instance, if the current media application is playing MP3, according to the recorded level, it is determined that the power supply of the display 230 should be turned off, and the command for turning off the power supply of the display 230 is sent to the power consumption controller 202.

In this step, first the current operation parameters of the system fan 240 can be compared with the saved due operation parameters for the level, and if they are different from each other, a command for adjusting the power supply of the system fan 240 is sent to the power consumption controller 202, otherwise no command is sent.

Step 307: receiving the low-power-consumption control command by the monolithic processor in the power consumption controller 202 and then based on the received command, sending a command for reducing the supply voltage or turning off the power supply of each of the devices to the monolithic processor in the power supply control module 211 in the ATX power supply 210.

Step 308: controlling, by the monolithic processor in the power supply control module 211 according to the received command for reducing the supply voltage or turning off the power supply of each of the devices, the power supply module 212 to adjust power supply for each of the media devices.

For example, if the current media application is playing MP3, the command received by the power consumption controller 202 is the command for turning off the power supply of the display 230, and the monolithic processor in the power supply control module 211 controls the power supply module 212 to turn off the power supply of the display 230.

If a command for adjusting the power supply of the system fan 240 is received in this step, the power supply of the system fan 240 is adjusted at the same time.

In this embodiment, it may not necessarily follow the above-mention procedure to adjust the CPU frequency, reduce the supply voltage or turn off the power supply for each of the devices or adjust the power supply of the system fan 240. These steps can be carried out in another sequence or in a parallel manner.

The Second Embodiment

This embodiment is in accordance with the second implementation and utilizes a monolithic processor in a VFD display, which is provided in a media-application-aimed PC and characterized with household appliance features, to implement a power consumption controller.

Figure 4:
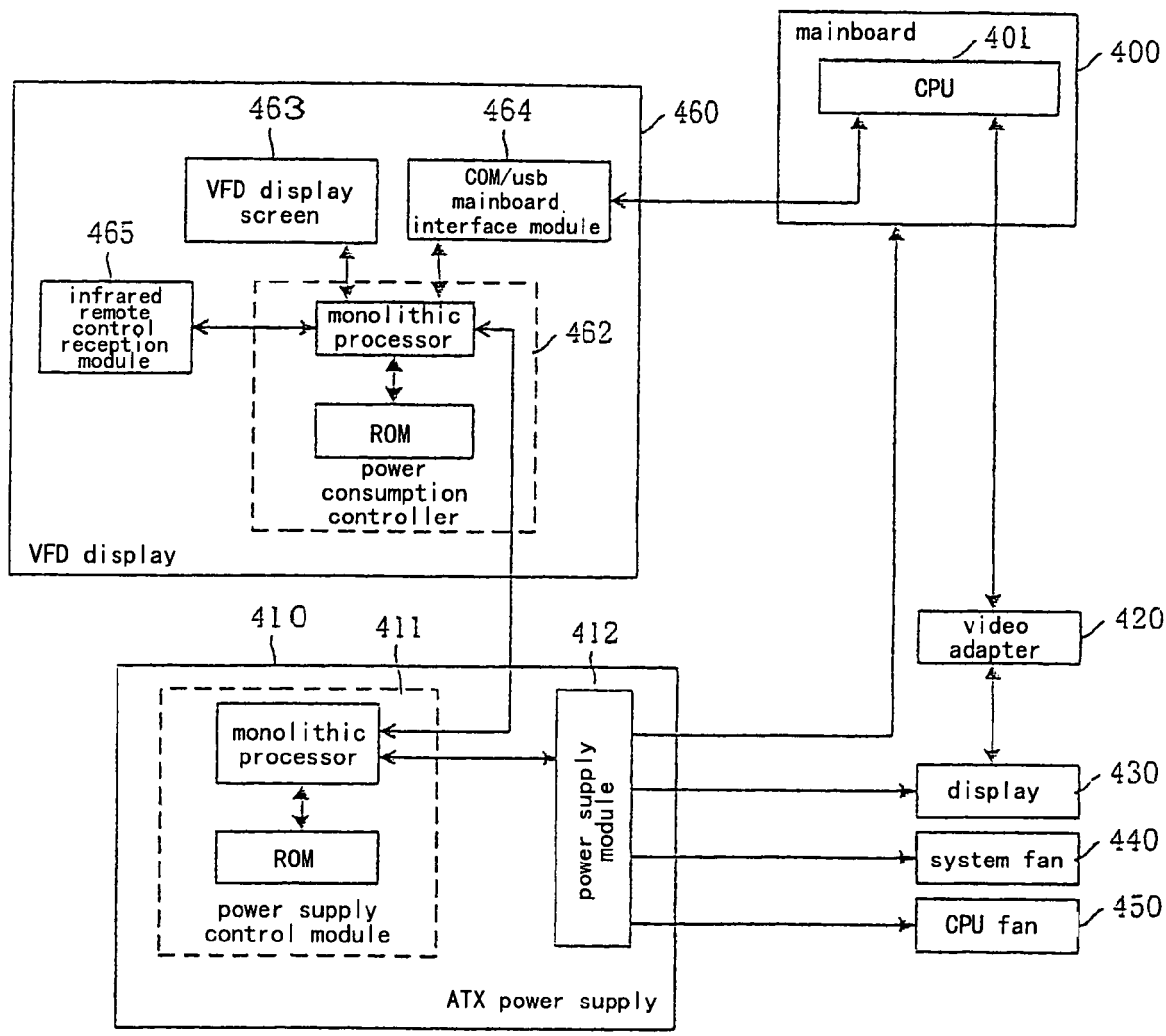
FIG. 4 is a schematic structural diagram of a PC in a low-power-consumption application according to a second preferred embodiment of the present invention.

Referring to FIG. 4, which is a schematic structural diagram of a PC in a low-power-consumption application according to a second preferred embodiment of the present invention. The computer in this embodiment includes a VFD display 460 that mainly contains a monolithic processor and its program memory, a VFD display screen 463, COM/USB mainboard interface module 464 and an infrared remote control reception module 465. The monolithic processor and its program memory of the VFD display 460 are configured as a power consumption controller 462. (only the CPU is shown on the mainboard 400, other devices on the mainboard 400 are irrelevant to the present invention, and are not shown for the purpose of a simple illustration.)

In FIG. 4, other devices, such as a video adapter 420, a display 430, a system fan 440 and a CPU fan 450, are the original ones belonging to the computer. They are connected to an ATX power supply 410 and the mainboard 400 in the same manner as in the prior art, the description thereof will be omitted here.

The ATX power supply 410 in this embodiment supplies AC-DC current to most of the hardware, including the above mainboard 400 and its CPU, the display 430 of the VFD display 460, the system fan 440, the CPU fan 450 and the video adapter 420, and the like.

The monolithic processor in the VFD display 460 is connected to a monolithic processor in a power supply control module 411 in the ATX power supply 410, and a power supply module 412 in the ATX power supply 410 is connected to the monolithic processor in the VFD display 460 and supplies power to the VFD display 460.

The infrared remote control reception module 465 receives and interprets a command sent by a remote control. The monolithic processor in the VFD display 460 sends the interpreted command to the CPU 401 on the mainboard 400 via the COM/USB mainboard interface module 464. Commands sent by the remote controller can be classified into two categories, one being low-power-consumption operation command, and the other being media application command.

The CPU 401 on the mainboard controls the operation of each of the devices based on the interpreted remote control command. If the CPU 401 on the mainboard receives a low-power-consumption operation command, it monitors and detects current application process. When certain media application process is detected, based on the media application, the CPU 401 on the mainboard determines a due state of power supply of each of the devices for the media application, and depending on the determined due state, it sends a low-power-consumption control command to the power consumption controller 462, that is, the monolithic processor in the VFD display 460, via the COM/USB mainboard interface module 464. For instance, if the current media application is playing MP3, it is determined that the power supply of the display 430 should be turned off, and the command for turning off the power supply of the display 430 is sent to the power consumption controller 462.

The detection for certain media application process by the CPU 401 on the mainboard may be initiated after the reception of a media application command sent by the VFD display 460 or the reception of a user-entered command. If it is the former case, during the media application, the CPU 401 on the mainboard also sends, via the COM/USB mainboard interface module 464, to the monolithic processor in the VFD display 460 some relevant information, such as chapters during DVD playing, time progress during playing, or fast-forward or fast-backward state, and the information is displayed on the VFD display screen 463 in the VFD display 460.

The devices for media application in this embodiment include the display 430, the system fan 440, etc.

The monolithic processor in the power consumption controller 462 receives the low-power-consumption control command from the CPU 401 on the mainboard, and based on the command, sends a command for reducing the supply voltage or turning off the power supply of each of the media devices to the monolithic processor in the power supply control module 411 in the ATX power supply 410.

According to the received command for reducing the supply voltage or turning off the power supply of each of the devices, the monolithic processor in the power supply control module 411 controls a power supply module 412 to adjust power supply for each of the media devices. For instance, if the current media application is playing MP3, the command received by the power consumption controller 462 is for turning off the power supply of the display 430, and the monolithic processor in the power supply control module 411 controls the power supply module 412 to turn off the power supply of the display 430.

In this embodiment, as in the first embodiment, the monolithic processor in the power consumption controller 462 and the monolithic processor in the power supply control module 411 can be connected to each other via a serial communication interface or an extended serial communication interface, and send the command for reducing the supply voltage or turning off the power supply of each of the media devices in series; they can also be connected via a parallel interface, with the command for reducing the supply voltage or turning off the power supply of each of the media devices being represented by high or low level of each signal line in the parallel interface.

In this embodiment, power consumption can also be reduced by adjusting the CPU frequency with software. The entire operation flow for realizing household appliance application with low power consumption according to the this embodiment is substantially the same as that in FIG. 3, except that the low-power-consumption command received by the CPU on the mainboard 400 has been interpreted and then sent by the monolithic processor in VFD display 460 based on its received infrared remote control command.

Furthermore, a low-power-consumption mode switch can be provided on the panel of the VFD display 460 no matter whether the infrared remote control reception 465 exists or not. Once the switch is pressed, a corresponding low-power-consumption operation command is sent to the CPU on the mainboard 400. The level of a low-power-consumption mode can also be sent directly to the CPU on the mainboard 400 by using the corresponding low-power-consumption operation command. In this case, it can be determined whether to adjust the frequency of the CPU 401 on the mainboard and the state of power supply of each of the devices at the level directly according to the level in Step 303 of the flowchart shown in FIG. 3, without the procedure of retrieving a corresponding level based on the media application.

Each of the flows of the CPUs on the mainboard in the above two embodiments can be implemented by providing a smart control center program in the computer.

Hereafter, the operation procedure of the second embodiment will be explained again by example of a user listening to MP3.

At first, the user sends a low-power-consumption operation command to the VFD display 460 through a remote controller. After being received by the infrared remote control reception module 465, the command is interpreted and sent by the monolithic processor in the VFD display to the CPU on the mainboard 400, strictly speaking, to the smart control center program running in the system.

Next, the CPU on the mainboard 400 starts to activate the smart control center program for detecting media application.

Then, the user sends a command for listening to MP3 to the VFD display 460 through the remote controller. After being received by the infrared remote control reception module 465, the command is interpreted and sent to the CPU on the mainboard 400.

When the above media application is detected, the CPU on the mainboard 400 determines the level of playing MP3 according to the preset levels of several media applications in the low-power-consumption operation mode. Then, based on the determined level, it retrieves the parameters set corresponding to the level and determines that it is possible to reduce the CPU frequency, slow down the speed of the system fan 440 and the CPU fan 450 and turn off the power supply for the display 430. Thus the CPU on the mainboard 400 reduces and records the operation frequency of the CPU, and sends a command for reducing the supply voltage for the system fan 440 and the CPU fan 450 as well as turning off the power supply for the display 430 to the monolithic processor in the power supply control module 411 in the ATX power supply 410.

While playing MP3, the CPU on the mainboard 400 also sends to the monolithic processor in the VFD display 460 some information about media playing, such as chapters during MP3 playing, time progress during playing, or fast-forward or fast-backward state, and the information is displayed on the VFD display screen 463 in the VFD display 460.

Upon receiving the command, the monolithic processor in the power supply control module 411 in the ATX power supply 410 reduces the supply voltage for the system fan 440 and the CPU fan 450 and turns off the power supply for the display 430.

Therefore, the system power consumption in household appliance application is reduced along with the CPU frequency of the system being decreased, the supply voltage for the system fan 440 and the CPU fan 450 being reduced and the power supply for the display 430 being turned off.

In this embodiment, the monolithic processor in the VFD display, which is characterized with household appliance features and provided in the computer, is utilized to implement the power consumption controller. In practical use, it is possible to use a LCD display externally connected to the computer or any other peripheral device containing a monolithic processor.

In both of the above embodiments, the control over power supply for various peripheral devices is realized by using the ATX power supply to adjust some supply voltage output.

In both of the above embodiments, if the user enters a command for canceling the low power consumption operation, the CPU on the mainboard sends a command for resuming normal power supply to the power consumption controller, which sends a command for resuming power supply for each of the devices to the ATX power supply according to the state of power supply for each of the devices at normal operation. The power control module in the ATX power supply controls the power supply module to resume power supply for the each of the devices at normal operation.

As can be seen from the above two embodiments, the computer and the method for realizing household appliance application with low power consumption according to the present invention makes a real-time adjustment to corresponding hardware power supplies, that is, reducing the supply voltage or powering off the hardware, depending on various requirements on hardware from various media applications by using a power consumption controller provided in the computer, thereby a low-power-consumption household appliance application by the computer can be achieved.

What is claimed:

1. A computer for realizing household appliance applications with low power consumption, comprising at least a mainboard with a CPU and a computer power supply for supplying power to respective functional devices of said computer, wherein
said computer is further provided with a power consumption controller connected to said CPU on the mainboard and said computer power supply, respectively;
said CPU on the mainboard receives an external low-power-consumption operation command, detects current application process, when a media application process is detected, it determines a due state of power supply of each of the devices for said media application according to said media application, and based on the determined due state, sends a low-power-consumption control command to said power consumption controller;
said power consumption controller receives said low-power-consumption control command, and based on the command, sends a command for reducing the supply voltage or turning off the power supply for each of the devices for said media application to said computer power supply; and
said computer power supply reduces the supply voltage or turns off the power supply for each of the devices for said media application according to said command for reducing the supply voltage or turning off the power supply;
wherein said power consumption controller is realized with a monolithic microprocessor in a peripheral device of the computer;
said computer power supply includes a power supply control module and a power supply module;
said power consumption controller is connected via the monolithic microprocessor of the peripheral device to said CPU on the mainboard and the power supply control module of said computer power supply, respectively; the monolithic microprocessor of the peripheral device receives the low-power-consumption control command, and based on the received command, sends to the power supply control module of said computer power supply the command for reducing the supply voltage or turning off the power supply for each of the devices for the media application.

2. The computer according to claim 1, wherein said power supply control module includes at least a second monolithic microprocessor; and
said power supply control module is connected via the second monolithic microprocessor to the monolithic microprocessor of the peripheral device and the power supply module, respectively; and based on the command for reducing the supply voltage or turning off the power supply received from the monolithic microprocessor of the peripheral device, the second monolithic microprocessor controls the power supply module to reduce the supply voltage or turn off the power supply for each of the devices for the media application.

3. The computer according to claim 2, wherein said second monolithic microprocessor is connected to the monolithic microprocessor of the peripheral device via a serial interface or a parallel interface.

4. The computer according to claim 1, wherein said peripheral device having a monolithic microprocessor is a vacuum flat display (VFD), display; the monolithic microprocessor of the VFD display is connected to said CPU on the mainboard and the power supply control module of the computer power supply, respectively; and
the monolithic microprocessor of the VFD display receives the low-power-consumption control command, and based on the received command, sends to the power supply control module of said computer power supply the command for reducing the supply voltage or turning off the power supply for each of the devices for the media application.

5. The computer according to claim 4, wherein a low-power-consumption mode switch is provided on the panel of said VFD display; and the monolithic microprocessor of the VFD display receives the low-power-consumption operation command from a user via said switch and sends it to said CPU on the mainboard.

6. The computer according to claim 4, wherein said VFD display includes an infrared remote control reception module; and the monolithic microprocessor of the VFD display receives the low-power-consumption operation command from a remote controller via said infrared remote control reception module and sends it to said CPU on the mainboard.

7. The computer according to claim 1, wherein said computer power supply is an ATX power supply.

8. A method for realizing a low-power-consumption household appliance application by using a computer having at least a mainboard with a CPU and a computer power supply for supplying power to respective functional devices of said computer, comprising steps of:
  A. detecting current application process by the CPU on the mainboard when it receives a low-power-consumption operation command;
  B. when a media application process is detected, determining a due state of power supply of each of the devices for the media application according to the media application, and based on the determined due state, sending a low-power-consumption control command to a power consumption controller;
  C. upon receiving the low-power-consumption control command, the power consumption controller, based on the command, sends to a computer power supply a command for reducing the supply voltage or turning off the power supply for each of the devices for the media application; and
  D. the computer power supply reduces the supply voltage or turns off the power supply for each of the devices for the media application based on said command for reducing the supply voltage or turning off the power supply, wherein said power consumption controller is realized with a monolithic microprocessor in a peripheral device of the computer,
  wherein when the peripheral device having a monolithic microprocessor is a vacuum flat display (VFD) display, a low-power-consumption mode switch is also provided on the VFD display, and said method further comprises:
  presetting levels of respective media applications in a low-power-consumption operation mode, each of the levels corresponding to one of key values of the low-power-consumption mode switch, and setting and saving due states of power supplies of respective devices correspondingly to each of the levels;
  said low-power-consumption operation command received by the CPU on the mainboard in Step A is a low-power-consumption operation command containing a level and sent by the VFD display according to the key value of the low-power-consumption mode switch entered by a user; and
  said determining a due state of power supply of each of the devices for the media application in Step B is:
  determining the due state of power supply of each of the devices according to the level contained in the low-power-consumption operation command.

9. The method according to claim 8, wherein said determining a due state of power supply of each of the devices for the media application in Step B is:
  first determining a level to which the media application belongs, and then based on the determined level, determining the due state of power supply of each of the devices.

10. The method according to claim 9, wherein the frequency of the CPU suitable for each of the levels is preset; and
  said Step B further includes: after the a level is determined, determining whether it is necessary to adjust the CPU frequency or not based on current CPU frequency and the CPU frequency suitable for the level, and adjusting the CPU frequency if necessary, otherwise no adjustment is made.

11. The method according to claim 10, wherein due operation parameters of a system fan at each of the levels are further preset; and
  said Step B further includes: after a level is determined, determining whether current operation parameters of the system fan are the same as the saved due operation parameters at the level or not, and if they are different, sending a command for adjusting the power supply of the system fan to the power consumption controller, otherwise no command is sent.

12. The method according to claim 8, wherein said method further comprises:
  upon receiving a command for canceling low-power-consumption operation, the CPU on the mainboard sends a command for resuming normal power supply to the power consumption controller; and
  the power consumption controller, depending on the power supply state of each of the devices at normal operation, sends to the computer power supply a command for resuming the power supply for each of the devices, and the computer power supply resumes the power supply for each of the devices at normal operation based on the command.

13. The method according to claim 8, wherein levels of respective media applications in the low-power-consumption operation mode are preset, and due states of power supplies of the devices are set and saved correspondingly to each of the preset levels; and
  said determining a due state of power supply of each of the devices for the media application in Step B is:
  first determining a level to which the media application belongs, and then based on the determined level, determining the due state of power supply of each of the devices.

14. A method for realizing a low-power-consumption household appliance application by using a computer having at least a mainboard with a CPU and a computer power supply for supplying power to respective functional devices of said computer, comprising steps of:
  A. detecting current application process by the CPU on the mainboard when it receives a low-power-consumption operation command;
  B. when a media application process is detected, determining a due state of power supply of each of the devices for the media application according to the media application, and based on the determined due state, sending a low-power-consumption control command to a power consumption controller;
  C. upon receiving the low-power-consumption control command, the power consumption controller, based on the command, sends to a computer power supply a command for reducing the supply voltage or turning off the power supply for each of the devices for the media application; and
  D. the computer power supply reduces the supply voltage or turns off the power supply for each of the devices for the media application based on said command for reducing the supply voltage or turning off the power supply, wherein said power consumption controller is realized with a monolithic microprocessor in a peripheral device of the computer,
  wherein when the peripheral device having a monolithic microprocessor is a vacuum flat display (VFD) display with a remote control reception module, said low-power-consumption operation command received by the CPU on the mainboard in Step A is the one that is received by the remote control reception module of the VFD display from a remote controller, and then interpreted and sent to said CPU on the mainboard.

* * * * *